US008701516B2

(12) United States Patent
Toyoda et al.

(10) Patent No.: US 8,701,516 B2
(45) Date of Patent: Apr. 22, 2014

(54) POWER TRANSMISSION CONTROL APPARATUS FOR VEHICLE

(75) Inventors: Hiroshi Toyoda, Nishio (JP); Takeshige Miyazaki, Chiryu (JP)

(73) Assignee: Aisin AI Co., Ltd., Nishio-Shi (JP)

( * ) Notice: Subject to any disclaimer, the term of this patent is extended or adjusted under 35 U.S.C. 154(b) by 152 days.

(21) Appl. No.: 13/378,164

(22) PCT Filed: Mar. 2, 2011

(86) PCT No.: PCT/JP2011/054686
§ 371 (c)(1),
(2), (4) Date: Dec. 14, 2011

(87) PCT Pub. No.: WO2011/135918
PCT Pub. Date: Nov. 3, 2011

(65) Prior Publication Data

US 2012/0090417 A1 Apr. 19, 2012

(30) Foreign Application Priority Data

Apr. 28, 2010 (JP) ................................ 2010-102833

(51) Int. Cl.
*F16H 59/00* (2006.01)

(52) U.S. Cl.
USPC ............................................... 74/335; 74/325

(58) Field of Classification Search
USPC ................................... 74/325, 333, 335, 339
See application file for complete search history.

(56) References Cited

U.S. PATENT DOCUMENTS

| | | | |
|---|---|---|---|
| 3,769,857 A * | 11/1973 | Whateley | 74/730.1 |
| 4,685,343 A * | 8/1987 | Ehrlinger et al. | 74/331 |
| 4,776,227 A | 10/1988 | Janiszewski | |
| 5,393,274 A | 2/1995 | Smedley | |
| 6,364,813 B1 * | 4/2002 | Patel et al. | 477/174 |
| 6,445,992 B2 * | 9/2002 | Wheeler et al. | 701/67 |
| 6,647,817 B2 * | 11/2003 | Kobayashi | 74/359 |
| 2009/0247362 A1 | 10/2009 | Nedachi et al. | |

FOREIGN PATENT DOCUMENTS

| | | |
|---|---|---|
| EP | 1 588 080 B1 | 9/2007 |
| JP | 07-145834 A1 | 6/1995 |
| JP | 2543874 B2 | 10/1996 |
| JP | 2005-291433 A1 | 10/2005 |
| JP | 2006-077926 A1 | 3/2006 |
| JP | 2006-513388 A1 | 4/2006 |
| JP | 2009-243502 A1 | 10/2009 |

* cited by examiner

*Primary Examiner* — Ha D Ho
(74) *Attorney, Agent, or Firm* — Burr & Brown, PLLC

(57) ABSTRACT

A sleeve stroke SSt of a specific sleeve is gradually increased from "0" (after t1) in a state in which a vehicle is stopped, a transmission is in a neutral state (all sleeve strokes SSt=0 (original position)), a clutch is in a disengaged state (clutch stroke CSt=0 (original position)), and an engine is operating (engine rotational speed NE>0). Upon determination that the sleeve stroke SSt has reached a predetermined value A, at which synchronization operation of a corresponding synchronization mechanism is performed, the sleeve stroke SSt is fixed to the predetermined value A, and an operation of increasing the clutch stroke CSt from "0" in a press engagement direction is started (time t2). An engagement start point CStlearn of the clutch is obtained based on a change in the rotational speed Ni of an input shaft Ai of the transmission after that (time t3).

7 Claims, 11 Drawing Sheets

ROTATIONAL SPEED
NE
Ni
Nref
0
CLUTCH STROKE
CStlearn
CSt
0
SLEEVE STROKE
SSt
0
TIME
t1
t2
t3
t4

POWER TRANSMISSION CONTROL APPARATUS FOR VEHICLE

BACKGROUND OF THE INVENTION

1. Field of the Invention

The present invention relates to a power transmission control apparatus for a vehicle.

2. Description of Related Art

Conventionally, there has been widely known a transmission which has an input shaft for receiving power from an engine of a vehicle, an output shaft for outputting power to drive wheels of the vehicle, and one or more sleeves provided on at least one of the input shaft and the output shaft such that each sleeve cannot rotate and can move in the axial direction in relation to the shaft (see, for example, Patent Document 1).

In this transmission, each sleeve selectively achieves an "established state" or an "un-established state" in accordance with the axial position thereof (sleeve position). The "established state" refers to a state in which the sleeve couples with a corresponding free rotating gear rotatably provided on the shaft on which the sleeve is provided, so as to non-rotatably fix the free rotating gear to the shaft, to thereby establish a corresponding gear stage. The "un-established state" refers to a state in which the sleeve does not couple with the corresponding free rotating gear and allows the free rotating gear to rotate in relation to the shaft, so that the corresponding gear stage is not established.

PRIOR ART DOCUMENT

Patent Document

PATENT DOCUMENT 1: Japanese Patent No. 2543874

SUMMARY OF THE INVENTION

This transmission may be combined with a clutch which is interposed between the output shaft of an engine and the input shaft of the transmission and which can adjust the maximum torque (clutch torque) transmittable between the output shaft of the engine and the input shaft of the transmission through adjustment of the axial position of the clutch (clutch position).

Recently, there has been developed a power transmission control apparatus which includes the above-mentioned transmission, the above-mentioned clutch, and control means for controlling, in accordance with a travelling state of the vehicle, sleeve actuators which adjust the sleeve positions of the above-mentioned sleeves and a clutch actuator which adjusts the clutch position of the clutch. Such a power transmission control apparatus is also called an "automated manual transmission" (AMT).

In such a power transmission control apparatus, as described above, clutch torque is adjusted through adjustment of the clutch position. More specifically, a map which defines the relation between clutch position and clutch torque (position-torque characteristic) is prepared (see FIGS. 3 and 6, which will be described later). A target clutch position is determined on the basis of this map and a (target) clutch torque to be generated. The clutch actuator is controlled so that the actual clutch position coincides with the target clutch position. Thus, the actual clutch torque is adjusted to coincide with the target clutch torque.

Incidentally, the actual "position-torque characteristic" may change because of, for example, wear of a friction member of the clutch. Accordingly, the actual characteristic may deviate from the characteristic defined by the map. In such a case, due to this "deviation," the target clutch position is not determined to an actually desired value. As a result, there arises a situation where the actual clutch torque is adjusted to a value different from the target clutch torque.

In order to cope with such a situation, the "position-torque characteristic" defined by the map must be corrected such that it coincides with the actual "position-torque characteristic." In the following description, a clutch position corresponding to a transition between an "engaged state" of the clutch and an "disengaged state" of the clutch will be referred to as an "engagement start point" (or a touch point, a stand-by point) (see FIG. 3).

The trend of deviation of the actual characteristic from that defined by the map appears as a deviation of the engagement start point. Therefore, in a widely employed conventional technique, the engagement start point is obtained by means of actually changing the clutch position in a "state in which the vehicle is stopped, the one or all the sleeves of the transmission are in the un-established state (that is, the transmission is in the neutral state), the clutch is in the disengaged state, and the engine is operating" (e.g., after startup of the engine), and correcting the map which defines the "position-torque characteristic" on the basis of the obtained engagement start point.

For example, such an engagement start point can be obtained by the processing shown in FIG. 11. That is, in this example, there is assumed a state in which the rotational speed of the input shaft of the transmission is maintained zero because the clutch is in the disengaged state (clutch torque=0) (before time tA). In this state, from time tA, the clutch position is advanced from its original position (zero) so as to increase engagement pressure. Thus, the clutch torque increases from zero, whereby the rotational speed of the input shaft of the transmission increases from zero. When the increasing rotational speed of the input shaft of the transmission exceeds a predetermined threshold value (a very small value), the clutch position at that time is obtained as an engagement start point.

However, in actuality, there may arise a phenomenon in which, despite the clutch being in the disengaged state (clutch torque=0), due to rotation of the output shaft of the engine, a very small rotational torque is transmitted to the input shaft of the transmission, whereby the input shaft of the transmission rotates at a relatively low rotational speed. This phenomenon occurs because of, for example, sliding resistance of a bearing which is provided on the output shaft side (specifically, a flywheel, etc.) of the engine to support a clutch-side end portion of the input shaft of the transmission, or viscous drag of lubrication oil inside the clutch (in the case where the clutch is of a wet type).

This phenomenon may bring about a situation in which, as shown in FIG. 12, even in a period before time tA, in which the clutch is in the disengaged state (clutch torque=0), the input shaft of the transmission rotates at a rotational speed greater than the threshold value. In such a case, the above-described method encounters difficulty in obtaining the above-mentioned engagement start point.

In view of the above-described problem, an object of the present invention is to provide a power transmission control apparatus for a vehicle which can reliably obtain an engagement start point of a clutch even upon occurrence of a phenomenon in which an input shaft of a transmission rotates (is dragged) due to rotation of an engine despite the clutch being in its disengaged state.

A power transmission control apparatus for a vehicle according to the present invention includes a transmission (T/M), a clutch (C/T), and control means (ECU, AC, AS1, AS2, AS3). The transmission includes an input shaft (Ai) for receiving power from an engine of the vehicle; an output shaft (Ao) for outputting power to drive wheels of the vehicle; one or a plurality of sleeves (S1, S2, S3) provided on a selected one of the input shaft and the output shaft such that the sleeve(s) cannot rotate but can move axially in relation to the selected shaft; and one or a plurality of synchronization mechanisms (Z1, Z2, Z3) provided for the respective sleeve(s).

Each sleeve selectively establishes the above-mentioned "established state" or the above-mentioned "un-established state" in accordance with the axial position of the sleeve (sleeve position). Each of the synchronization mechanisms performs synchronization operation, when the sleeve position of the corresponding sleeve is changed from a position corresponding to the above-mentioned "un-established state" toward a position corresponding to the above-mentioned "established state," so as to apply friction torque to the corresponding sleeve and the corresponding free rotating gear such that the rotational speed difference therebetween decreases.

The clutch (friction clutch) is interposed between the output shaft of the engine and the input shaft of the transmission, and the maximum torque (clutch torque) which can be transmitted between the output shaft of the engine and the input shaft of the transmission can be adjusted through adjustment of the axial position of the clutch (clutch position).

The control means controls the sleeve position(s) of the sleeve(s) and the clutch position of the clutch, by making use of respective actuators, in accordance with a travelling state of the vehicle. Each sleeve position is controlled (feedback control) by a sleeve actuator such that the sleeve position detected by a sleeve position sensor coincides with a target value. The clutch position is controlled (feedback control) by a clutch actuator such that the clutch position detected by a clutch position sensor coincides with a target value.

This power transmission control apparatus is characterized in that the control means includes obtaining means which operates as follows. In a "state in which the vehicle is stopped, the one sleeve or all the plurality of sleeves of the transmission are in the un-established state, the clutch is in a disengaged state in which no power transmission route is formed between the output shaft of the engine and the input shaft of the transmission, and the engine is operating," the obtaining means adjusts the sleeve position of the one sleeve or any one of the plurality of sleeves (specific sleeve) so as to realize a state (synchronization state) in which the "specific sleeve is in the un-established state, and the synchronization mechanism corresponding to the specific sleeve performs the synchronization operation." In the synchronization state, the obtaining means adjusts the clutch position and obtains, as an engagement start point, a clutch position corresponding to a transition between an engaged state in which a power transmission route is formed between the output shaft of the engine and the input shaft of the transmission, and the disengaged state in which the power transmission route is not formed. The expression "the one sleeve or all the plurality of sleeves of the transmission are in the un-established state" means that the transmission is in a neutral state (no gear stage is established).

By virtue of the above-described configuration, the above-mentioned "synchronization state" is realized before the clutch position is adjusted for obtainment of the engagement start point. That is, as a result of the above-mentioned "synchronization operation" of the synchronization mechanism corresponding to the specific sleeve, the above-mentioned friction torque acts on the specific sleeve and the free rotating gear corresponding to the specific sleeve. In consideration of the fact that the vehicle is in a stopped state (that is, rotation of the output shaft of the transmission is stopped), this friction torque serves as a torque acting on the input shaft of the transmission in a direction for stopping rotation thereof (speed reducing direction).

Accordingly, even in the case where the above-mentioned phenomenon in which the input shaft of the transmission slightly rotates (is dragged) due to rotation of the engine despite the clutch being in the disengaged state" occurs before the clutch position is adjusted for obtaining the engagement start point, rotation of the input shaft of the transmission can be stopped by means of the above-mentioned torque in the speed reducing direction. As a result, the adjustment of the clutch position can be started in a state in which the rotation of the input shaft of the transmission is stopped. Accordingly, the engagement start point of the clutch can be obtained reliably. In addition, on the basis of the engagement start point obtained in this manner, the map which defines the "position-torque characteristic" of the clutch can be corrected.

Specifically, the obtaining means may be configured as follows. The sleeve position of the specific sleeve is first changed from a position corresponding to the un-established state toward a position corresponding to the established state. After that, upon determination that the sleeve position has reached a predetermined position corresponding to the synchronization state, the changing of the sleeve position is ended, and the clutch position is started to change from the position corresponding to the disengaged state in a press engagement direction. After that, the engagement start point is obtained on the basis of a change in the rotational speed of the input shaft of the transmission.

Alternatively, the obtaining means may be configured as follows. The sleeve position of the specific sleeve is first changed from a position corresponding to the un-established state toward a position corresponding to the established state. After that, upon determination that the rotational speed of the input shaft of the transmission has started to decrease, the changing of the sleeve position is ended, and the clutch position is started to change from the position corresponding to the disengaged state in a press engagement direction. After that, the engagement start point is obtained on the basis of a change in the rotational speed of the input shaft of the transmission.

Alternatively, the obtaining means may be configured as follows. The sleeve position of the specific sleeve is first changed from a position corresponding to the un-established state toward a position corresponding to the established state. After that, upon determination that the rotational speed of the input shaft of the transmission has started to decrease, the changing of the sleeve position is ended. After that, upon determination that the rotational speed of the input shaft of the transmission has reached to zero, the clutch position is started to change from the position corresponding to the disengaged state in a press engagement direction. After that, the engagement start point is obtained on the basis of a change in the rotational speed of the input shaft of the transmission.

The engagement start point may be obtained upon determination that the rotational speed of the input shaft of the transmission has exceeded a predetermined very small value while increasing. Alternatively, the engagement start point may be obtained upon determination that the rotational speed of the input shaft of the transmission has started to increase from zero.

DETAILED DESCRIPTION OF THE INVENTION

A power transmission control apparatus for a vehicle according to an embodiment of the present invention (present apparatus) will now be described with reference to the drawings. The present apparatus includes a transmission T/M, a clutch C/T, and an ECU. The transmission T/M has five gear stages (first to fifth speeds) for moving the vehicle frontward, and a single gear stage (reverse) for moving the vehicle backward.

Figure 1:
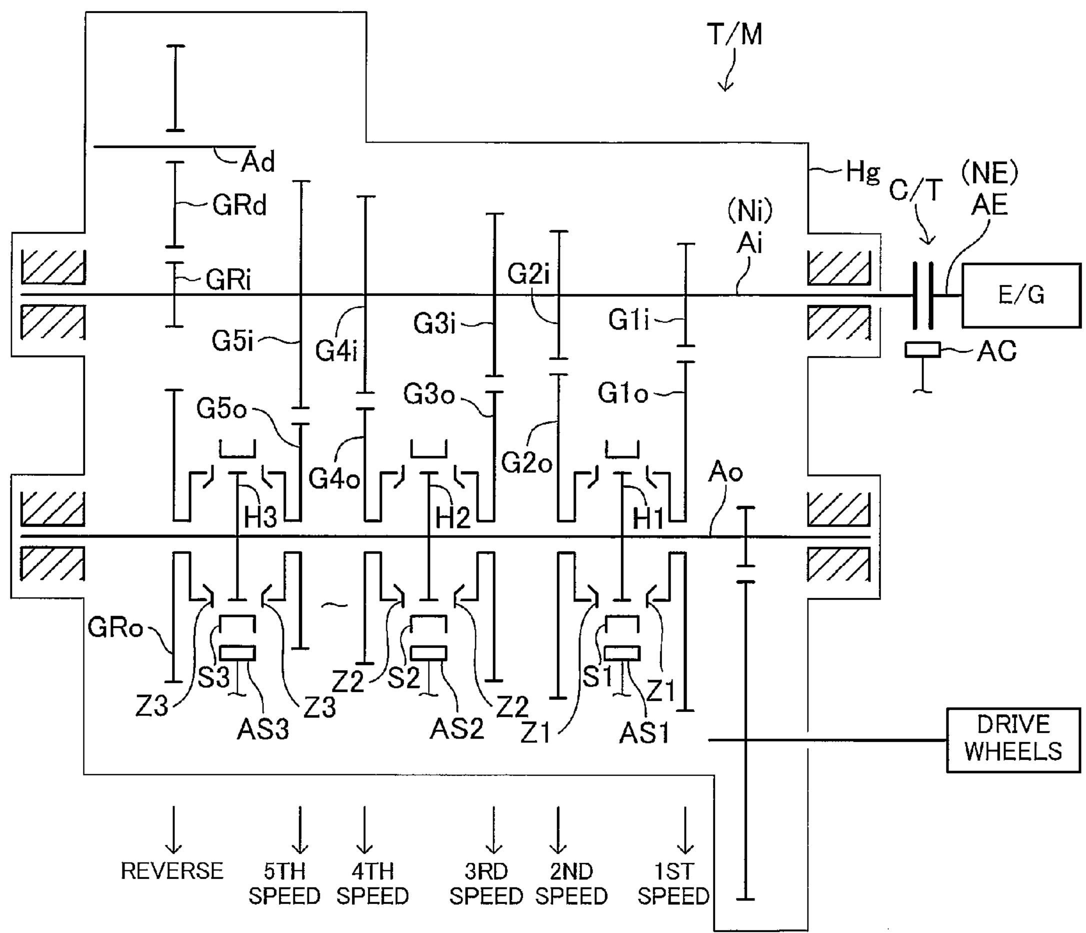
FIG. 1 is a schematic diagram showing a power transmission control apparatus according to an embodiment of the present invention.
Figure 1:
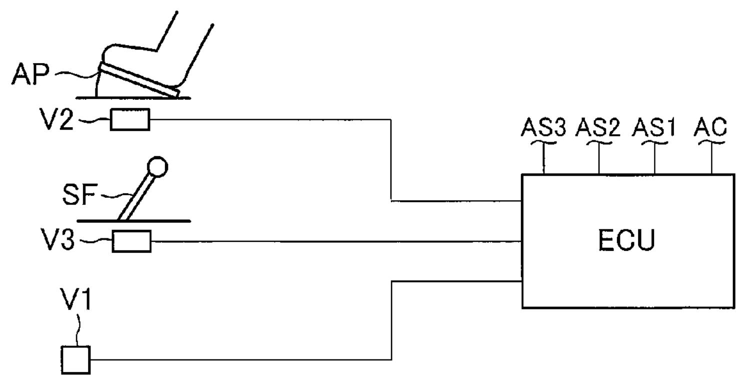

As shown in FIG. 1, the transmission T/M includes an input shaft Ai and an output shaft Ao. Opposite ends of the input shaft Ai are rotatably supported on a housing (casing) Hg via a pair of bearings. Opposite ends of the output shaft Ao are rotatably supported on the housing Hg via a pair of bearings. The output shaft Ao is disposed at a position shifted from that of the input shaft Ai such that the output shaft Ao is parallel with the input shaft Ai. The input shaft Ai is connected, via the clutch C/T, to an output shaft AE of an engine E/G, which is a drive source of the vehicle. The output shaft Ao is connected to the drive wheels of the vehicle in a power transmitable manner.

In the following description, a gear provided on a shaft such that it cannot rotate in relation to the shaft will be referred to as a "fixed gear," and a gear provided on a shaft such that it can rotate in relation to the shaft will be referred to as a "free rotating gear." Each fixed gear is fixed to a corresponding shaft by making use of one of known mating methods such that the gear can neither rotate nor move axially in relation to the shaft. Each free rotating gear is disposed on a corresponding shaft via, for example, a needle bearing, such that the gear can rotate in relation to the shaft. Like the fixed gear, each hub is fixed to a corresponding shaft by making use of one of known mating methods such that the hub can neither rotate nor move axially in relation to the shaft. Each hub has an (external) spline formed on a cylindrical outer circumferential surface thereof.

The input shaft Ai supports a reverse drive gear GRi, a 5th-speed drive gear G5*i*, a 4th-speed drive gear G4*i*, a 3rd-speed drive gear G3*i*, a 2nd-speed drive gear G2*i*, and a 1st-speed drive gear G1*i*, which are coaxially provided between the pair of bearings in this sequence from the left side in FIG. 1. The drive gears GRi, G1*i*, G2*i*, G3*i*, G4*i*, and G5*i* are all fixed gears. The drive gear GRi is always in meshing engagement with an idle gear GRd provided on an idle shaft Ad disposed in parallel to the input shaft Ai.

The output shaft Ao supports a reverse driven gear GRo, a hub H3, a 5th-speed driven gear G5*o*, a 4th-speed driven gear G4*o*, a hub H2, a 3rd-speed driven gear G3*o*, a 2nd-speed driven gear G2*o*, a hub H1, and a 1st-speed driven gear G1*o*, which are coaxially provided between the pair of bearings in this sequence from the left side in FIG. 1. The driven gears G1*o*, G2*o*, G3*o*, G4*o*, and G5*o* are all free rotating gears.

The driven gears G1*o*, G2*o*, G3*o*, G4*o*, and G5*o* are always in meshing engagement with the drive gears G1*i*, G2*i*, G3*i*, G4*i*, and G5*i*, respectively. The driven gear GRo is always in meshing engagement with the idle gear GRd. That is, the reverse driven gear GRo is connected to the reverse drive gear GRi via the idle gear GRd.

A cylindrical sleeve S1 is always in spline engagement with the outer circumference of the hub H1 such that the sleeve S1 can move in the axial direction. In the case where the sleeve S1 is located at a position shown in FIG. 1 (original position), the sleeve S1 spline-engages with neither of a 1st-speed piece which rotates unitarily with the driven gear G1*o*, and a 2nd-speed piece which rotates unitarily with the driven gear G2*o*. When the sleeve S1 moves from the original position to a rightward position (1st-speed position) with respect to the axial direction, the sleeve S1 spline-engages with the 1st-speed piece. When the sleeve S1 moves from the original position to a leftward position (2nd-speed position) with respect to the axial direction, the sleeve S1 spline-engages with the 2nd-speed piece.

A cylindrical sleeve S2 is always in spline engagement with the outer circumference of the hub H2 such that the sleeve S2 can move in the axial direction. In the case where the sleeve S2 is located at a position shown in FIG. 1 (original position), the sleeve S2 spline-engages with neither of a 3rd-speed piece which rotates unitarily with the driven gear G3*o*, and a 4th-speed piece which rotates unitarily with the driven gear G4*o*. When the sleeve S2 moves from the original position to a rightward position (3rd-speed position) with respect to the axial direction, the sleeve S2 spline-engages with the 3rd-speed piece. When the sleeve S2 moves from the original position to a leftward position (4th-speed position) with respect to the axial direction, the sleeve S2 spline-engages with the 4th-speed piece.

A cylindrical sleeve S3 is always in spline engagement with the outer circumference of the hub H3 such that the sleeve S3 can move in the axial direction. In the case where the sleeve S3 is located at a position shown in FIG. 1 (original position), the sleeve S3 spline-engages with neither of a 5th-speed piece which rotates unitarily with the driven gear G5*o*, and a reverse piece which rotates unitarily with the driven gear GRo. When the sleeve S3 moves from the original position to a rightward position (5th-speed position) with respect to the axial direction, the sleeve S3 spline-engages with the 5th-speed piece. When the sleeve S3 moves from the original position to a leftward position (reverse position) with respect to the axial direction, the sleeve S3 spline-engages with the reverse piece.

As described above, the transmission T/M includes a "plurality of fixed gears, each of which is coaxially and non-rotatably provided on the input shaft or the output shaft, and which correspond to the plurality of gear stages"; a "plurality of free rotating gears, each of which is coaxially and rotatably provided on the input shaft or the output shaft, which correspond to a plurality of gear stages, and which are always in meshing engagement with the fixed gears of the corresponding gear stages"; a "plurality of hubs each of which is coaxially and non-rotatably provided on the input shaft or the output shaft"; and a "plurality of sleeves which are coaxially, non-rotatably, and axially movably fitted onto the corresponding hubs and which can engage with the corresponding free rotating gears so as to fix the corresponding free rotating gears to the corresponding shaft in a non-rotatable manner."

The axial positions of the sleeves S1, S2, and S3 are individually adjusted by sleeve actuators AS1, AS2, and AS3. When all the sleeves S1, S2, and S3 are in their original positions, there is established a neutral state in which no power transmission route is formed between the input shaft Ai and the output shaft Ao. When the sleeve S1 moves to a 1st-speed position in the neutral state, a power transmission route having a 1st-speed reduction ratio is formed (1st speed is established). When the sleeve S1 moves to a 2nd-speed position in the neutral state, a power transmission route having a 2nd-speed reduction ratio is formed (2nd speed is established). When the sleeve S2 moves to a 3rd-speed position in the neutral state, a power transmission route having a 3rd-speed reduction ratio is formed (3rd speed is established). When the sleeve S2 moves to a 4th-speed position in the neutral state, a power transmission route having a 4th-speed reduction ratio is formed (4th speed is established). When the sleeve S3 moves to a 5th-speed position in the neutral state, a power transmission route having a 5th-speed reduction ratio is formed (5th speed is established). When the sleeve S3 moves to a reverse position in the neutral state, a power transmission route having a reverse reduction ratio is formed (reverse is established).

Also, a synchronization mechanism Z1 is provided for the sleeve S1 and/or the "1st-speed and 2nd-speed pieces," a synchronization mechanism Z2 is provided for the sleeve S2 and/or the "3rd-speed and 4th-speed pieces," and a synchronization mechanism Z3 is provided for the sleeve S3 and/or the "5th-speed and reverse pieces." Each synchronization mechanism has one of known configurations. Each synchronization mechanism operates as follows. When the corresponding sleeve moves from the "original position" to a "position of the corresponding gear stage," the synchronization mechanism applies friction torque to the "corresponding sleeve" and the "piece unified with the free rotating gear of the corresponding gear stage" such that the rotational speed difference therebetween decreases (performs synchronization operation).

Figure 2:
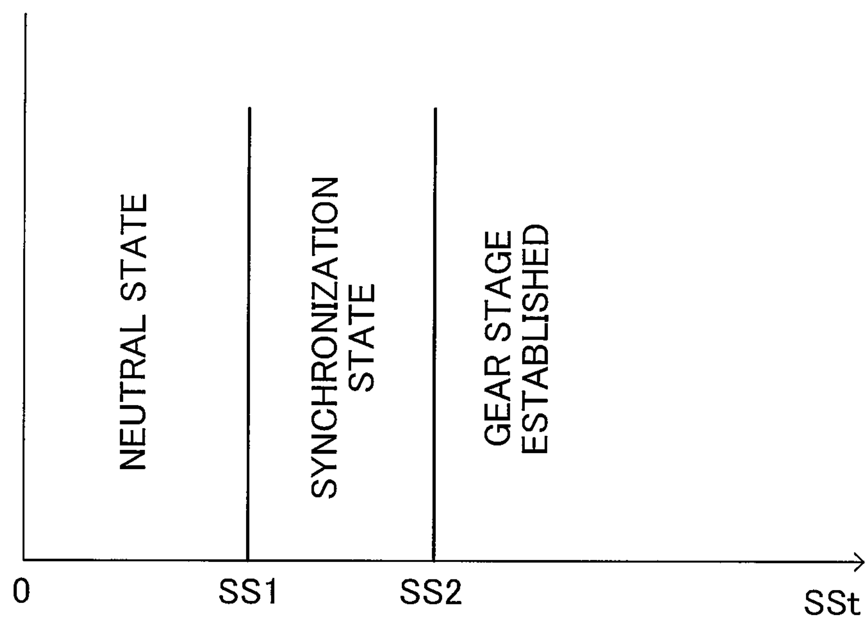
FIG. 2 is a chart for describing the relation between the sleeve stroke of each sleeve shown in FIG. 1 and the state of a transmission.

In the following description, the amount of (relative) axial movement of each sleeve from its "original position" will be referred to as the sleeve stroke SSt. When the sleeve is located at the "original position," the sleeve stroke SSt becomes "0." As shown in FIG. 2, when $0 \leq SSt < SS1$, the sleeve is in a state in which spline engagement is not established between the sleeve and the corresponding piece and the synchronization operation is not performed (the above-mentioned friction torque is not generated) (that is, the neutral state). When $SS1 \leq SSt < SS2$, the sleeve is in a state in which spline engagement is not established between the sleeve and the corresponding piece but the synchronization operation is performed (the above-mentioned friction torque is generated). This state will be referred to as the "synchronization state." When $SS2 \leq SSt$, the sleeve is in a state in which spline engagement is established between the sleeve and the corresponding piece (that is, a state in which a corresponding gear stage is established). SS1 and SS2 are constant values.

The clutch C/T is interposed between the output shaft AE of the engine E/G and the input shaft Ai of the transmission T/M. The clutch C/T is a friction clutch having one of known structures. That is, the axial position of a clutch disk (friction member) attached to the input shaft Ai of the transmission T/M can be adjusted in relation to a flywheel provided on the output shaft AE of the engine E/G. The axial position of the clutch C/T (more precisely, the clutch disk) is adjusted by a clutch actuator AC.

Figure 3:
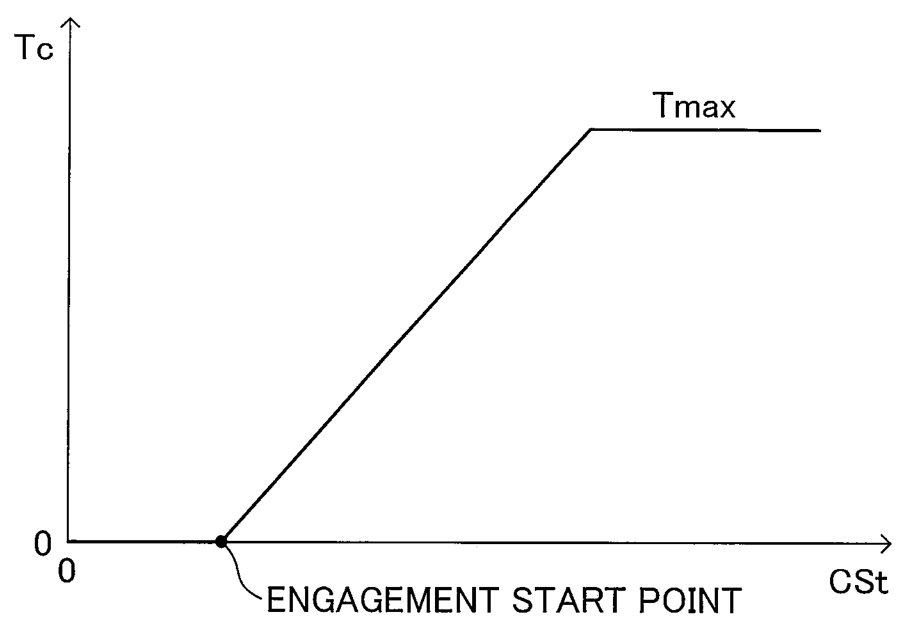
FIG. 3 is a graph showing a map which defines the "stroke-torque characteristic" of a clutch shown in FIG. 1.

In the following description, the amount of movement of the clutch C/T from its original position (position most distance from the flywheel) in a press engagement direction will be referred to as a clutch stroke CSt. When the clutch C/T is located at the "original position," the clutch stroke CSt becomes "0." As shown in FIG. 3, through adjustment of the clutch stroke CSt, the maximum torque (clutch torque Tc) which the clutch C/T can transmit is adjusted. When "$Tc=0$," no power transmission route is formed between the output shaft AE of the engine E/G and the input shaft Ai of the transmission T/M. This state will be referred to as a "disengaged state." When "$Tc>0$," a power transmission route is formed between the output shaft AE and the input shaft Ai. This state will be referred to as an "engaged state."

Also, the present apparatus includes a wheel speed sensor V1 for detecting the speed of each wheel of the vehicle, an accelerator opening sensor V2 for detecting the amount of operation of an accelerator AP (accelerator opening), and a shift position sensor V3 for detecting the position of a shift lever SF.

Moreover, the present apparatus includes the electronic control unit ECU. The ECU controls the clutch actuator AC and the sleeve actuators AS1 to AS3 in accordance with information from the above-mentioned sensors V1 to V3, etc., to thereby control the gear stage of the transmission T/M and the clutch torque Tc of the clutch C/T.

Notably, each sleeve stroke SSt is controlled by means of feedback control (servo control) such that the sleeve stroke detected by a corresponding sleeve stroke sensor (not shown) coincides with a target value. The clutch stroke CSt is controlled by means of feedback control (servo control) such that the clutch stroke detected by a clutch stroke sensor (not shown) coincides with a target value. As described above, the present apparatus is a power transmission apparatus using an automated manual transmission (AMT).

(Ordinary Control)

In the present apparatus, in the case where the shift lever SF is located at a position corresponding to an "automatic mode," a gear stage to be selected (selected gear stage) is determined on the basis of a gear charge map stored in ROM (not shown) within the ECU and information from the above-mentioned sensors. In the case where the shift lever SF is located at a position corresponding to a "manual mode," a selected gear stage is determined on the basis of an operation of the shift lever SF by a driver. In the transmission T/M, the selected gear stage is established. In a period in which the selected gear stage is established, the clutch torque Tc may be set to an arbitrary value within a range greater than drive torque of the engine E/G (engine torque) (that is, within a range in which no slippage occurs at the clutch C/T). Thus, a power transmission route having a reduction ratio of the selected gear stage is formed between the output shaft AE of the engine E/G and the output shaft Ao of the transmission T/M, whereby the engine torque can be transmitted to the drive wheels. In the case where the gear stage of the transmission T/M is changed (that is, gear change operation is performed), over a predetermined period during the speed change operation, the clutch C/T is maintained in the disengaged state (Tc=0). Also, the clutch C/T is maintained in the disengaged state (Tc=0) when the vehicle is in a stopped state or a like state. In the above, ordinary control provided by the present apparatus has been described.

(Obtainment of Engagement Start Point)

As described above, the clutch torque Tc is adjusted through adjustment of the clutch stroke CSt. More specifically, a target clutch stroke is determined on the basis of a previously prepared map which is shown in FIG. 3 and which defines a "stroke-torque characteristic (position-torque characteristic)" and a (target) clutch torque to be achieved. The clutch actuator AC is controlled such that the actual clutch stroke CSt coincides with this target clutch stroke. Thus, the actual clutch torque Tc is adjusted to coincide with the target clutch torque.

Incidentally, the actual "stroke-torque characteristic" may change because of, for example, wear of the clutch disk of the clutch C/T. Accordingly, the actual characteristic may deviate from the characteristic defined by the map. In the case where such a "deviation" has been generated, the target clutch stroke (position) is not determined to an actually desired value. As a result, there arises a situation where the actual clutch torque is adjusted to a value different from the target clutch torque.

In order to cope with such a situation, the "stroke-torque characteristic" defined by the map must be corrected such that it coincides with the actual "stroke-torque characteristic." In the following description, a clutch stroke corresponding to a transition between an "engaged state" of the clutch and an "disengaged state" of the clutch will be referred to as an "engagement start point" (or a touch point, a stand-by point) (see FIG. 3). The trend of deviation of the actual characteristic from that defined by the map appears as a deviation of the engagement start point. Therefore, in the present apparatus, the engagement start point is actually obtained, and the map which defines the "stroke-torque characteristic" is corrected on the basis of the obtained engagement start point.

In order to obtain the engagement start point, it is necessary to actually change the clutch stroke Cst, to thereby maintain the clutch C/T in the disengaged state (clutch torque=0) at least over a short period of time. Therefore, in the present apparatus, processing of acquiring the engagement start point is performed in a "state in which the vehicle is stopped, the transmission T/M is in the neutral state, the clutch C/T is in the disengaged state, and the engine E/G is operating" (e.g., after startup of the engine E/G).

As described in the "SUMMARY OF THE INVENTION" section, the "phenomenon in which the input shaft Ai of the transmission slightly rotates (is dragged) due to rotation of the output shaft AE of the engine despite the clutch C/T being in the disengaged state" makes the obtainment of the engagement start point difficult. In contrast, in the present apparatus, an operation of adjusting the clutch stroke CSt is started in a state in which rotation of the input shaft Ai is stopped by making use of a phenomenon in which the friction torque generated as a result of the above-described synchronization operation of each synchronization mechanism serves as a torque acting on the input shaft Ai of the transmission T/M in a direction for stopping rotation thereof (speed reducing direction).

Next, processing of obtaining the engagement start point (engagement-start-point obtaining processing) executed by the present apparatus will be described with reference to the flowchart shown in FIGS. 4 and 5. In FIG. 5, NE represents rotational speed of the output shaft AE of the engine E/G (engine rotational speed), and Ni represents rotational speed of the input shaft Ai of the transmission T/M. Notably, NE and Ni may be determined on the basis of information from unillustrated sensors.

The present apparatus (ECU) first determines in step 405 whether or not obtainment conditions are satisfied. When the ECU makes a "No" determination, the ECU ends the present processing. The obtainment conditions are satisfied when the "vehicle is in a stopped state, the transmission T/M is in the neutral state, the clutch C/T is in the disengaged state, the engine E/G is operating, and other predetermined conditions are satisfied."

In the example shown in FIG. 5, before time t1, at which the obtainment conditions are satisfied, the vehicle stops, the transmission T/M is in the neutral state (the sleeve stroke SSt of each sleeve=0), the clutch C/T is in the disengaged state (clutch stroke CSt=0), and the engine E/G is operating (for example, in an idling state) (NE>0). Also, in the example shown in FIG. 5, before time t1, there has occurred the above-described "phenomenon in which the input shaft Ai of the transmission T/M slightly rotates (is dragged) due to rotation of the output shaft AE of the engine despite the clutch C/T being in the disengaged state." As a result, before time t1, the rotational speed Ni of the input shaft Ai assumes a value greater than a threshold value (very small value) Nref for obtaining the engagement start point.

If the obtaining conditions are satisfied ("Yes" in step 405), in step 410, the ECU gradually increases the sleeve stroke SSt of a specific sleeve from "0." The specific sleeve refers to a selected one of the above-mentioned sleeves S1, S2, and S3. In the example shown in FIG. 5, at time t1, the above-mentioned obtainment conditions are satisfied ("Yes" in step 405). As a result, through execution of step 410, the sleeve stroke SSt of a specific sleeve gradually increases from "0."

In step 415, the ECU determines whether or not the sleeve stroke SSt has reached a predetermined value A. When the ECU makes a "No" determination, the ECU repeats the processing of step 410. That is, the ECU continues the operation of increasing the sleeve stroke SSt until the sleeve stroke SSt reaches the predetermined value A. When the sleeve stroke SSt reaches the predetermined value A ("Yes" in step 415), through execution of steps 420 and 425, the ECU fixes the sleeve stroke SSt to the current value, and gradually increases the clutch stroke CSt from "0."

In the example shown in FIG. 5, at time t2, the sleeve stroke SSt reaches the predetermined value A. Accordingly, after time t2, the sleeve stroke SSt is fixed to the predetermined value A, and the clutch stroke CSt gradually increases from "0."

The predetermined value A is a value corresponding to the above-mentioned "synchronization state," and is determined such that SS1≤A<SS2 (see FIG. 2). Accordingly, at time t2, the "specific sleeve" is not spline-engaged with the "piece unified with the free rotating gear corresponding to the specific sleeve," and the "synchronization mechanism corresponding to the specific sleeve" is performing synchronization operation." That is, the above-mentioned friction torque acts on the "specific sleeve" and the "free rotating gear corresponding to the specific sleeve."

In consideration of the fact that the vehicle is in a stopped state (that is, rotation of the output shaft Ao of the transmission T/M is stopped), this friction torque serves as a torque acting on the input shaft Ai of the transmission T/M in a direction for stopping rotation thereof (speed reducing direction). Accordingly, after time t2, due to this torque in the speed reducing direction, the rotational speed Ni of the input shaft Ai gradually decreases to "0."

Meanwhile, when, after time t2, the clutch stroke CSt exceeds the actual engagement start point whereby the clutch torque Tc becomes greater than "0," the input shaft Ai starts to receive power from the engine side. This power received by the input shaft Ai gradually increases as the clutch torque Tc increases as a result of the increasing clutch stroke CSt. Consequently, the rotational speed Ni of the input shaft Ai, which has once reached to "0" due to the above-described torque in the speed reducing direction, gradually increases from "0" as the clutch torque Tc increases.

In step 430, the ECU determines whether or not the rotational speed Ni of the input shaft Ai has exceeded the above-mentioned threshold value Nref. When the ECU makes a "No" determination, the ECU repeats the processing of step 425. That is, the operation of increasing the clutch stroke CSt is continued until the rotational speed Ni of the input shaft Ai exceeds the threshold value Nref. In the example shown in FIG. 5, the operation of increasing the clutch stroke CSt is continued up to time t3, at which, the rotational speed Ni of the input shaft Ai exceeds the threshold value Nref.

When the rotational speed Ni of the input shaft Ai exceeds the threshold value Nref, in step 435, the ECU obtains the current clutch stroke CSt as an actual engagement start point of the clutch C/T. In the example shown in FIG. 5, the clutch stroke CSt at time t3 is obtained as an engagement start point CStlearn of the clutch C/T.

Subsequently, in step 440, the ECU performs end processing. Specifically, the clutch stroke CSt and the sleeve stroke SSt of the specific sleeve are gradually returned to "0." In the example shown in FIG. 5, after time t3, the operation of decreasing the clutch stroke CSt is first started, and the operation of decreasing the sleeve stroke SSt is then started. The sequence of the start timings of these two stroke decreasing operations may be reversed. Then, before or at time t4, each of the clutch stroke CSt and the sleeve stroke SSt returns to zero. That is, at time t4, the engagement-start-point obtaining processing ends.

Figure 6:
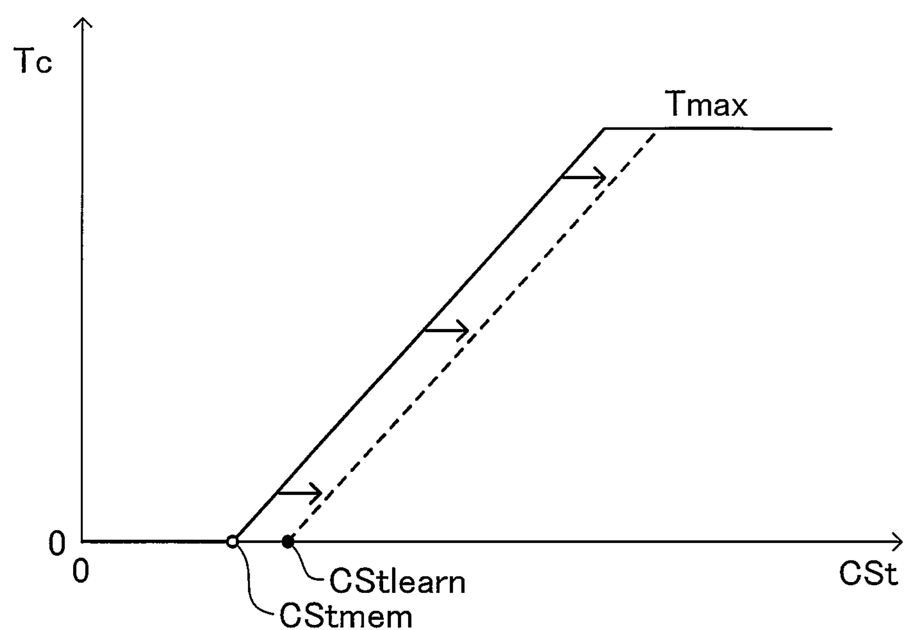
FIG. 6 is a chart for describing correction of the map which defines the "stroke-torque characteristic," the correction being performed on the basis of the obtained engagement start point.

The engagement start point Cstlearn obtained in the above-described manner is used to correct the map which defines the "stroke-torque characteristic" of the clutch C/T. For example, as shown in FIG. 6, in the case where the engagement start point in the map which is currently stored in the ROM of the ECU and defines the "stroke-torque characteristic" of the clutch C/T is CStmem (<CStlearn), the characteristic of this map is corrected from the characteristic represented by a solid line to the characteristic represented by a broken line. Once this correction is performed, the target clutch stroke of the clutch C/T is determined such that it becomes equal to an actually required clutch stroke. As a result, the actual clutch torque of the clutch C/T coincides with the target clutch torque.

(Action and Effects)

As described above, according to the present apparatus, even in the case where the above-mentioned "phenomenon in which the input shaft Ai of the transmission slightly rotates (is dragged) due to rotation of the engine despite the clutch C/T being in the disengaged state" occurs before the clutch stroke CSt is adjusted for obtaining the engagement start point, rotation of the input shaft Ai of the transmission can be stopped by means of the above-mentioned torque in the speed reducing direction, which is generated as a result of synchronization operation. As a result, the adjustment of the clutch stroke CSt can be started in a state in which the rotation of the input shaft Ai of the transmission is stopped. Accordingly, the actual engagement start point of the clutch C/T can be obtained reliably. In addition, on the basis of the engagement start point obtained in this manner, the map which defines the "stroke-torque characteristic" of the clutch C/T can be corrected.

The present invention is not limited to the above-described embodiment, and various moderations may be employed without departing from the scope of the present invention. For example, in the above-described embodiment, upon determination that the "sleeve stroke SSt has reached the predetermined value A corresponding to the above-mentioned synchronization state (see FIG. 2), the sleeve stroke SSt is fixed, and the clutch stroke CSt is increased from "0" (see steps 415, 420, and 425 of FIG. 4, and time t2 of FIG. 5).

Figure 4:
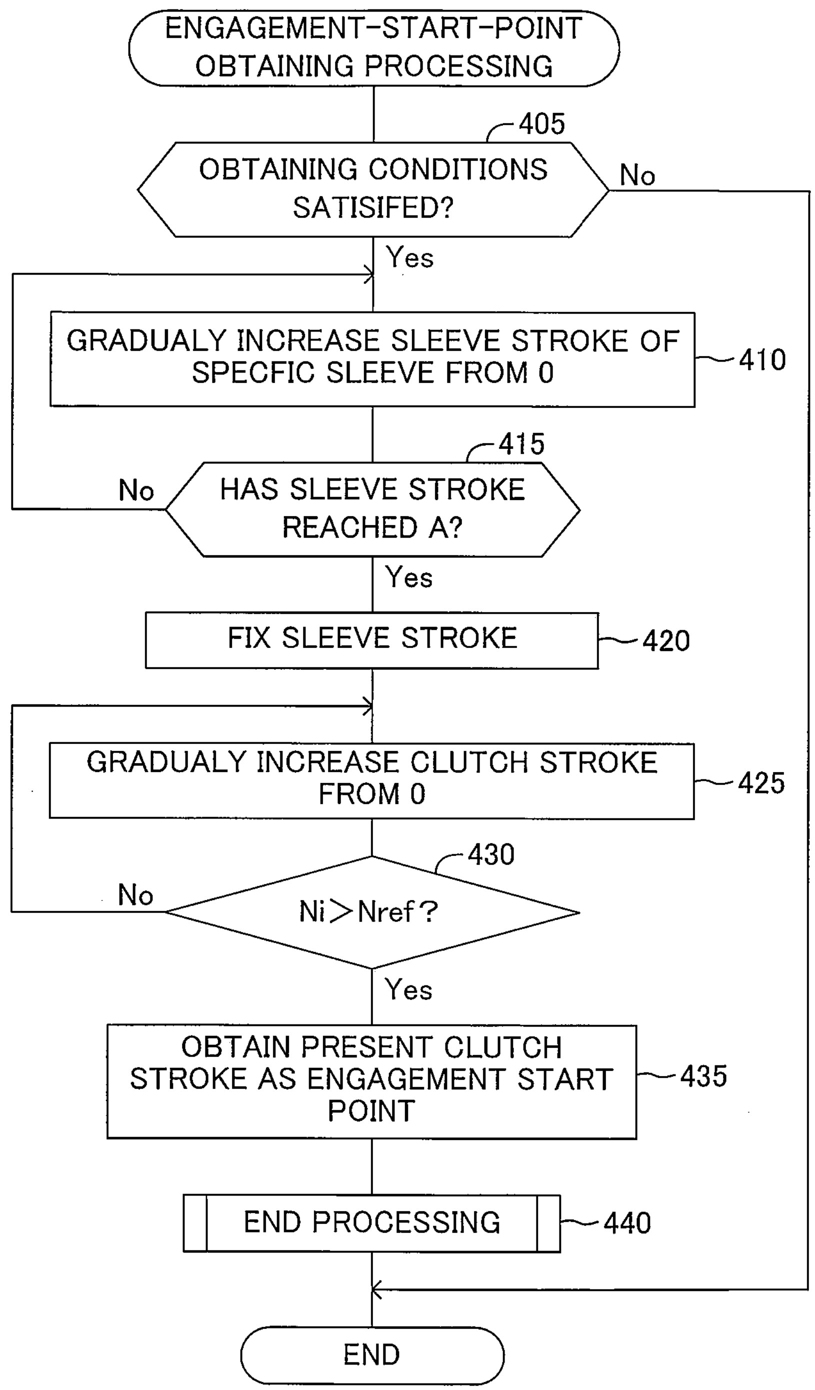
FIG. 4 is a flowchart showing the flow of engagement-start-point obtaining processing executed by an ECU shown in FIG. 1.
Figure 5:
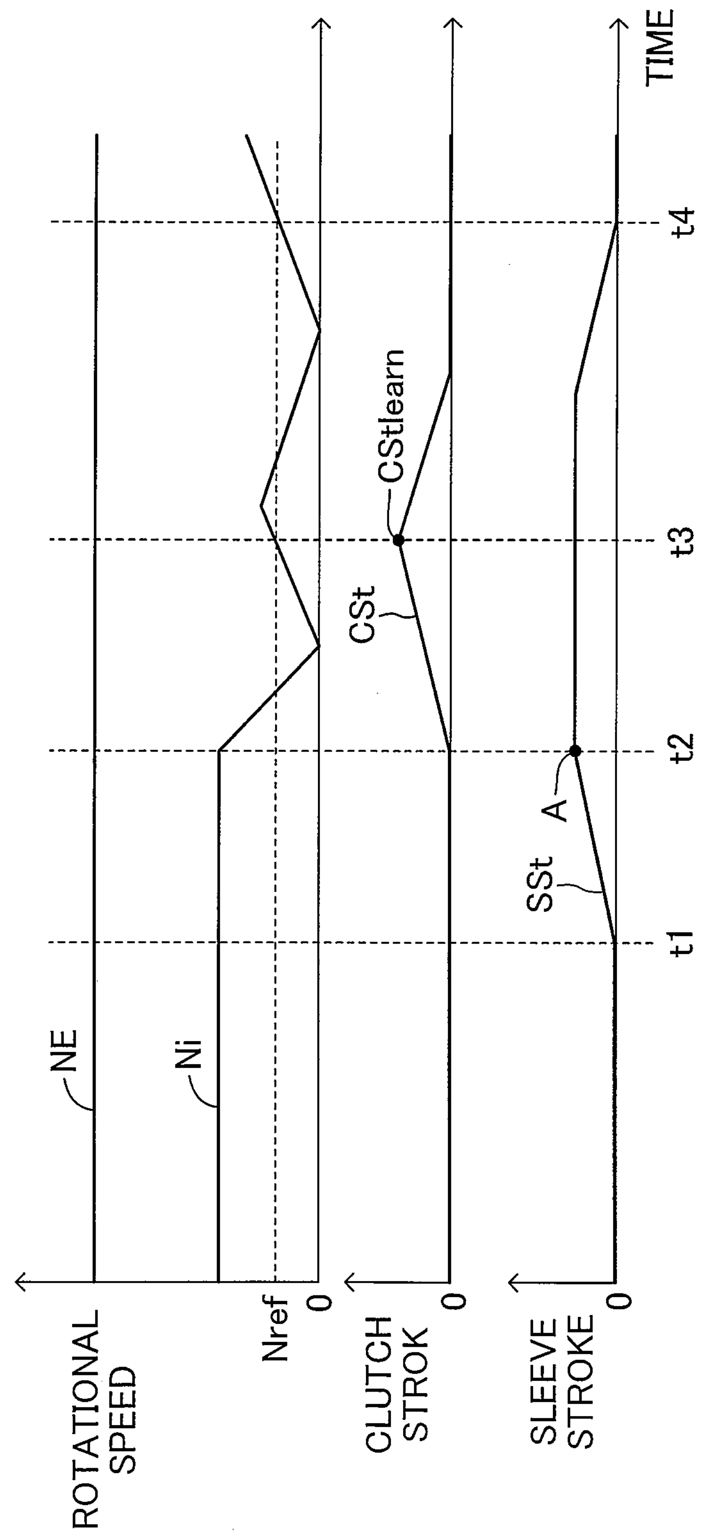
FIG. 5 is a time chart showing an example case where an engagement start point is obtained by the processing shown in FIG. 4.
Figure 7:
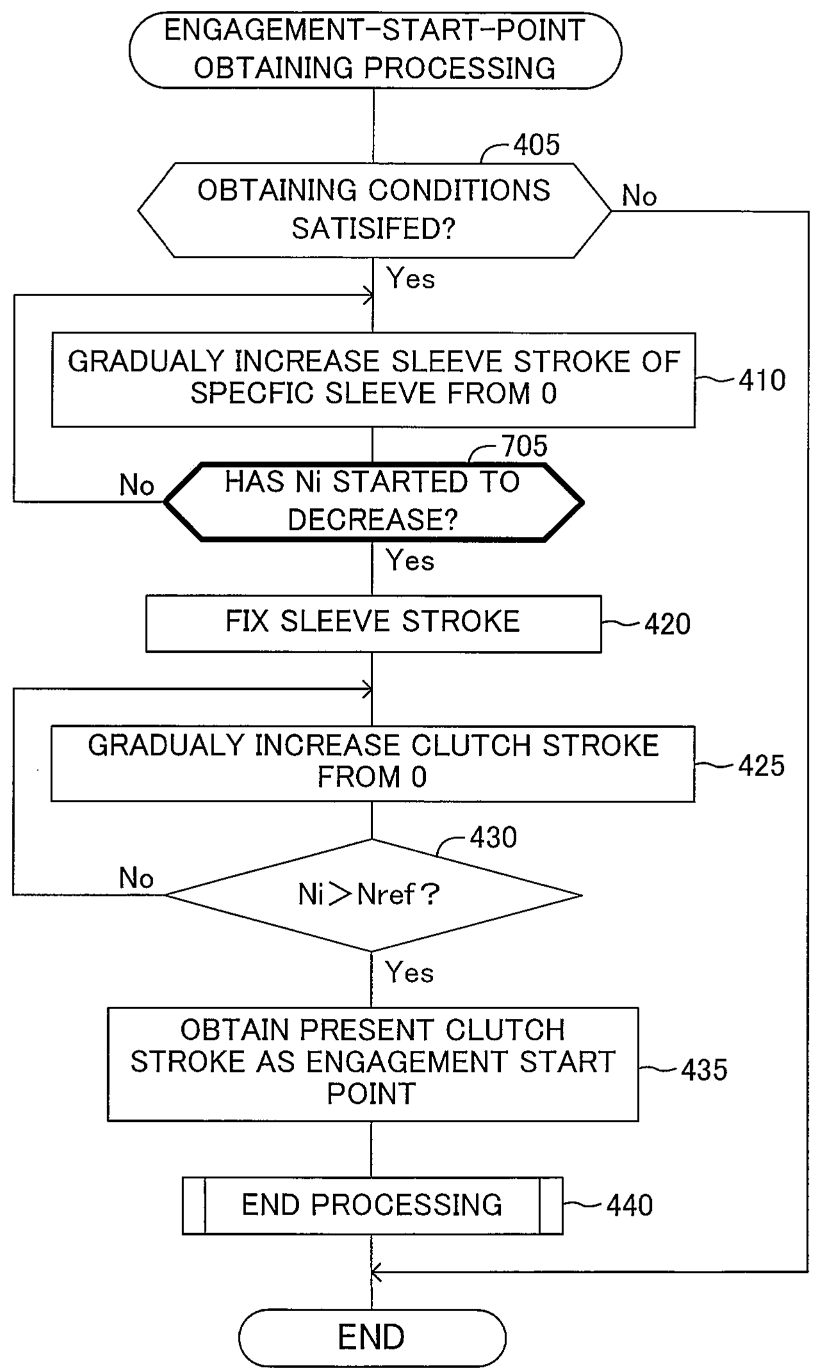
FIG. 7 is a flowchart showing the flow of engagement-start-point obtaining processing executed by an ECU of a power transmission control apparatus according to a modification of the embodiment of the present invention.
Figure 8:
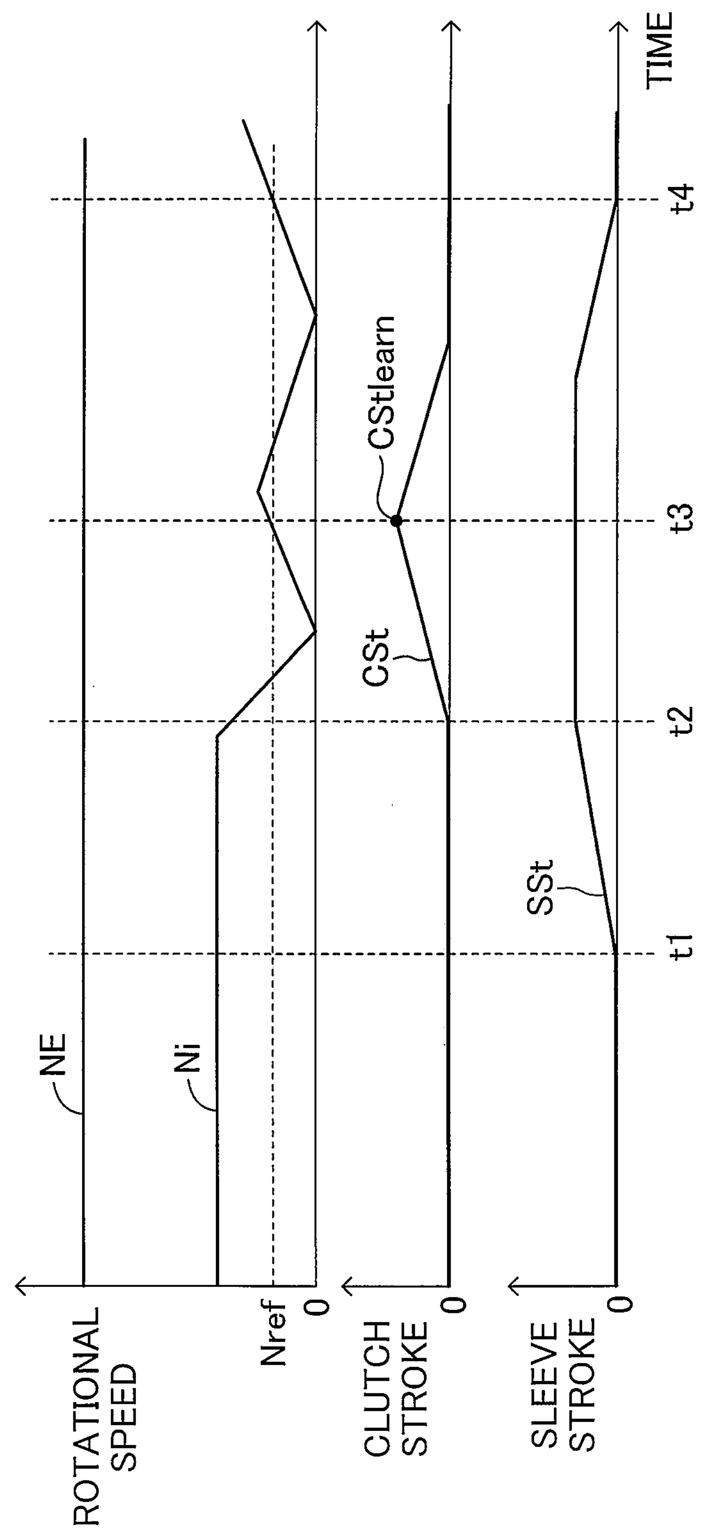
FIG. 8 is a time chart showing an example case where an engagement start point is obtained by the processing shown in FIG. 7.

However, the power transmission control apparatus of the present invention may be configured such that, as shown in FIGS. 7 and 8 corresponding to FIGS. 4 and 5, respectively, upon determination that the "rotational speed Ni of the input shaft Ai of the transmission T/M has started to decrease," the sleeve stroke SSt is fixed, and the clutch stroke CSt is increased from "0" (first modification; see steps 705, 420, and 425 of FIG. 7 and time t2 of FIG. 8). Notably, the flowchart of FIG. 7 is identical with the flowchart of FIG. 4, except that step 705 replaces step 415 of FIG. 4.

Figure 9:
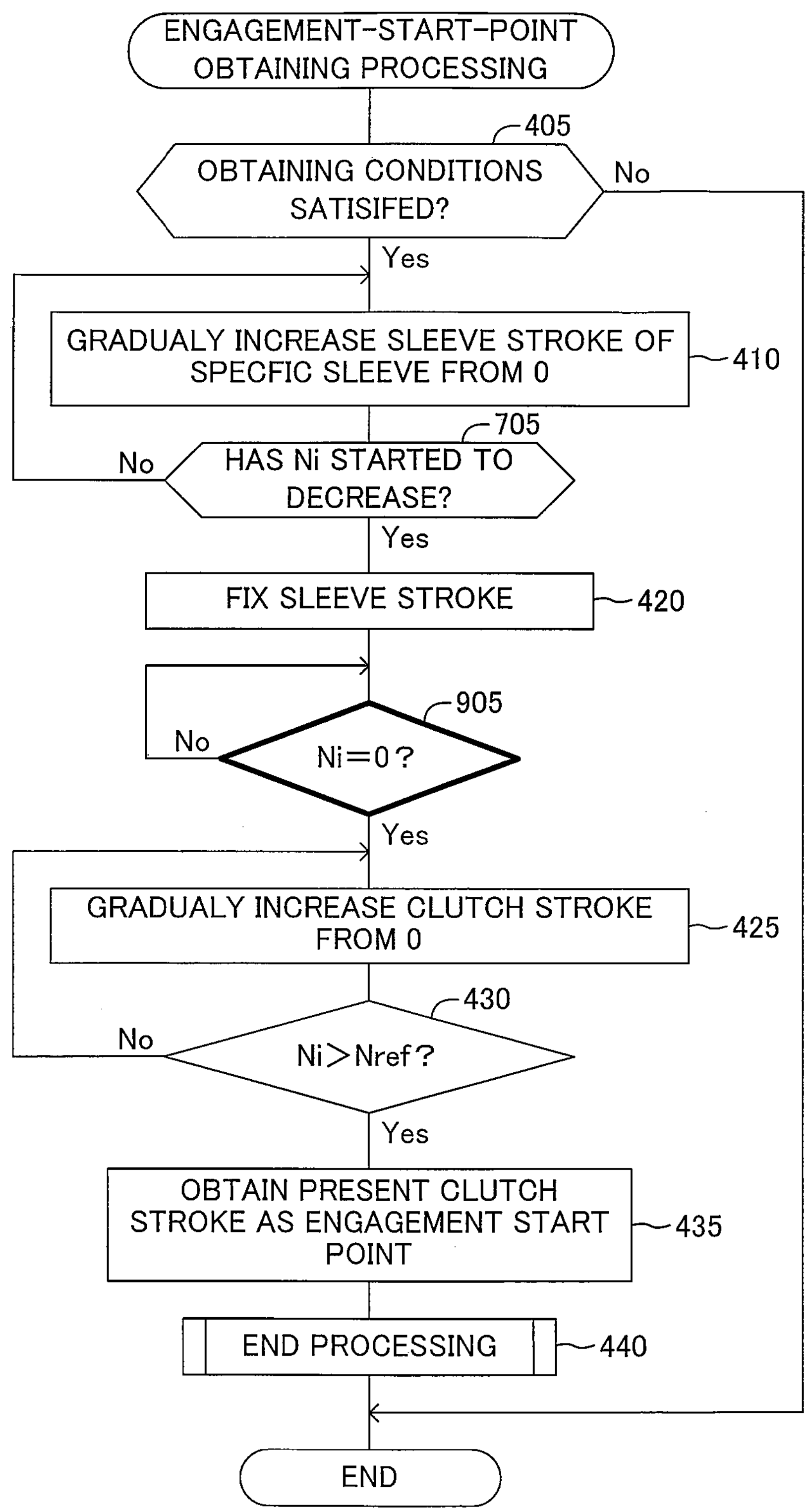
FIG. 9 is a flowchart showing the flow of engagement-start-point obtaining processing executed by an ECU of a power transmission control apparatus according to another modification of the embodiment of the present invention.
Figure 10:
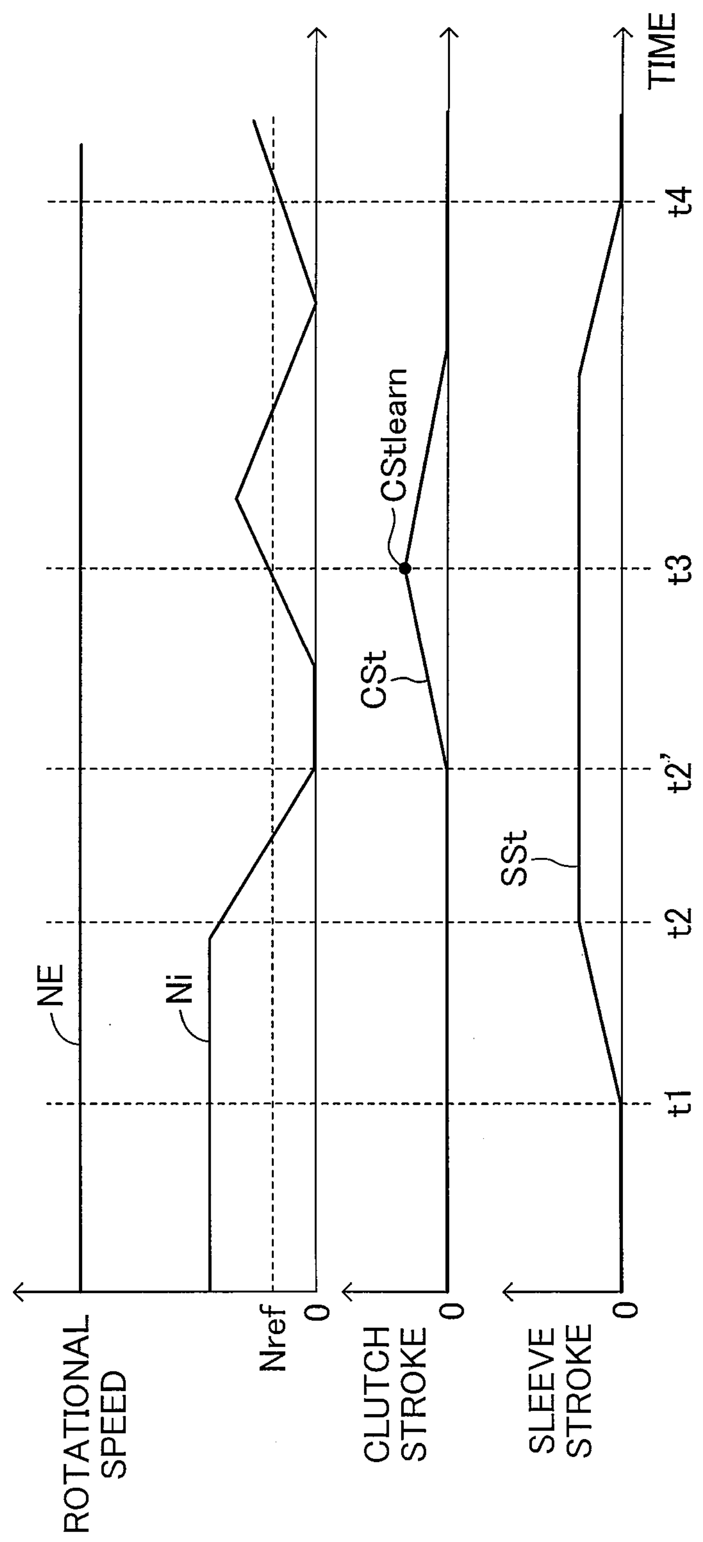
FIG. 10 is a time chart showing an example case where an engagement start point is obtained by the processing shown in FIG. 9.
Figure 11:
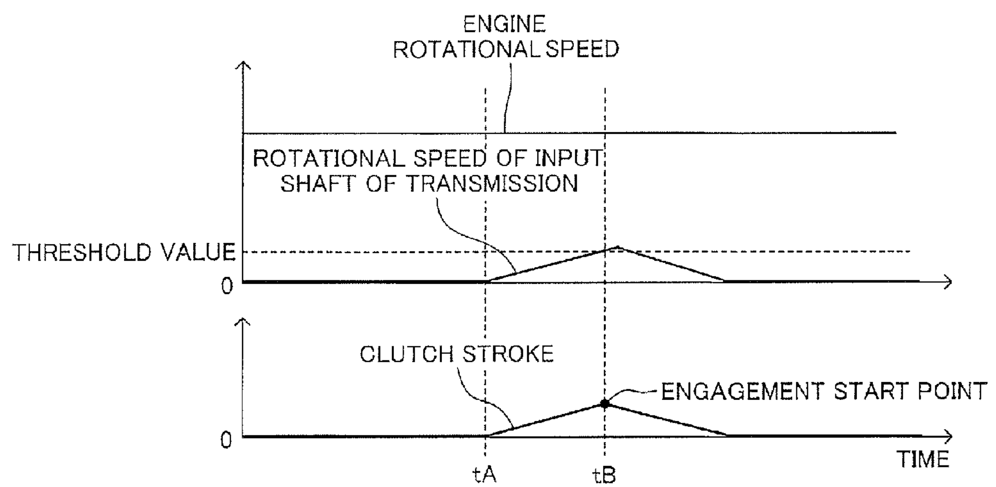
FIG. 11 is a time chart showing an example case where an engagement start point is normally obtained by a conventional power transmission apparatus.
Figure 12:
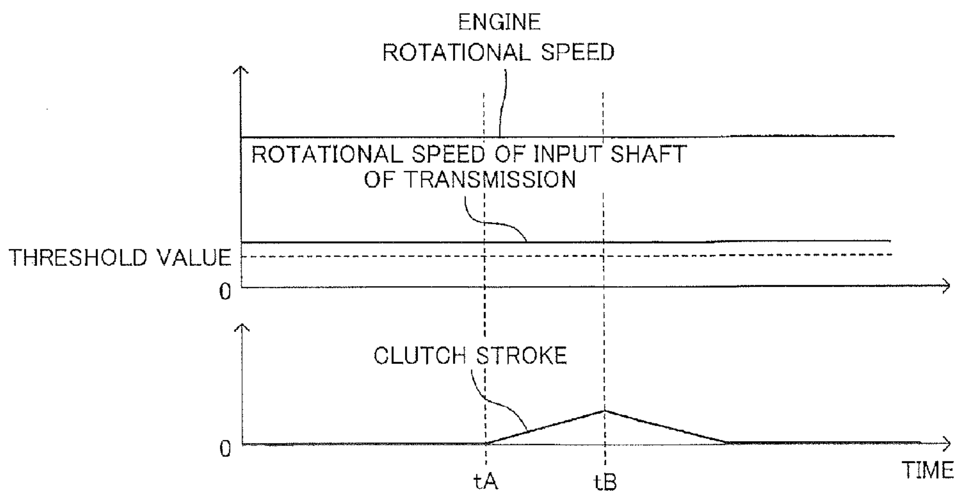
FIG. 12 is a time chart showing an example case where the conventional power transmission apparatus fails to normally obtain an engagement start point because of a "phenomenon in which an input shaft of a transmission rotates (is dragged) due to rotation of an engine despite that a clutch is in its disengaged state."

Also, the power transmission control apparatus of the present invention may be configured such that, as shown in FIGS. 9 and 10 corresponding to FIGS. 7 and 8, respectively, upon determination that the "rotational speed Ni of the input shaft Ai of the transmission T/M has started to decrease", the sleeve stroke SSt is fixed; and, upon determination that the "rotational speed Ni of the input shaft Ai has reached 0," the clutch stroke CSt is increased from "0" (second modification; see steps 705, 420, 905, and 425 of FIG. 9 and times t2 and t2' of FIG. 10). Notably, the flowchart of FIG. 9 is identical with the flowchart of FIG. 7, except that step 905 is inserted between steps 420 and 425.

Notably, in the above-described second modification, the clutch stroke is adjusted after the reliable detection of the "rotational speed Ni of the input shaft Ai having reached 0." Therefore, the second modification is excellent in that the engagement start point can be obtained more reliably, as compared with the above-described embodiment and first modification. Meanwhile, in the above-described embodiment and first modification, the operation of fixing the sleeve stroke and the operation of increasing the clutch stroke are started at the same time. Therefore, the above-described embodiment and first modification are excellent in that the engagement-start-point obtaining processing is completed within a shorter period of time, as compared with the second modification.

In the above-described embodiment and modifications, the engagement start point is obtained upon determination that the "increasing rotational speed Ni of the input shaft Ai of the transmission T/M has exceeded the threshold value Nref." However, the engagement start point may be obtained upon determination that the "rotational speed Ni has started to increase from 0."

In the above-described embodiment and modifications, the present invention is applied to a power transmission control apparatus which includes a transmission having a single input shaft, and a single clutch connected to the single input shaft. However, the present invention may be applied to a power transmission control apparatus which includes a transmission having two input shafts, and two clutches connected to the two input shafts, respectively. This apparatus is also called a double clutch transmission (DCT).

In addition, in the above-described embodiment and modifications, the engagement start point of the clutch C/T is obtained upon determination that the rotational speed Ni of the input shaft Ai has exceeded the threshold value Nref in the course of the rotational speed Ni increasing as a result of a gradual increase in the clutch stroke of the clutch C/T. However, the engagement start point of the clutch C/T may be obtained upon determination that the rotational speed Ni of the input shaft Ai has become less than the threshold value Nref in the course of the rotational speed Ni decreasing as a result of a gradual decrease in the clutch stroke of the clutch C/T.

Due to influence of hysteresis, the actual "stroke-torque characteristic" of the clutch C/T in a period in which the clutch stroke increases may differ from that in a period in which the clutch stroke decreases. Accordingly, a deviation may be produced between the engagement start point in the course of the clutch stroke increasing (in a clutch stroke in which the clutch torque changes from zero to a non-zero value) and the engagement start point in the course of the clutch stroke decreasing (in a clutch stroke in which the clutch torque changes from a non-zero value to zero). Accordingly, in the case where such hysteresis is taken into account, these two engagement start points must be handled separately.

DESCRIPTION OF REFERENCE NUMERALS

T/M: manual transmission; E/G: engine; C/T: clutch; Ai: input shaft; Ao: output shaft; S1, S2, S3: sleeves; Z1, Z2, Z3: synchronization mechanisms; AC: clutch actuator; AS1 to AS3: sleeve actuators; V1: wheel speed sensor; V2: accelerator opening sensor; V3: shift position sensor: ECU: electronic control unit

The invention claimed is:

1. A power transmission control apparatus for a vehicle comprising:

a transmission which includes an input shaft for receiving power from an engine of the vehicle; an output shaft for outputting power to drive wheels of the vehicle, one or a plurality of sleeves provided on a selected one of the input shaft and the output shaft such that the sleeves cannot rotate and can move axially in relation to the selected shaft, and one or a plurality of synchronization mechanisms provided for the sleeve(s), each sleeve selectively establishing, in accordance with sleeve position, which is the axial position of the sleeve, an established state in which the sleeve couples with a corresponding free rotating gear rotatably provided on the selected one of the input shaft and the output shaft so as to non-rotatably fix the free rotating gear to the selected one of the input shaft and the output shaft, to thereby establish a corresponding gear stage or an un-established state in which the sleeve does not couple with the corresponding free rotating gear and allows the free rotating gear to rotate in relation to the selected one of the input shaft and the output shaft, whereby the corresponding gear stage is not established, and each of the synchronization mechanisms performing synchronization operation, when the sleeve position of the corresponding sleeve is changed from a position corresponding to the un-established state toward a position corresponding to the established state, so as to apply friction torque to the corresponding sleeve and the corresponding free rotating gear such that the rotational speed difference therebetween decreases;

a clutch interposed between an output shaft of the engine and the input shaft of the transmission and adapted to change clutch torque, which is the maximum torque which can be transmitted between the output shaft of the engine and the input shaft of the transmission, through adjustment of clutch position, which is than axial position of the clutch; and control means for controlling the sleeve position(s) of the sleeve(s) and the clutch position of the clutch, by making use of respective actuators, in accordance with a traveling state of the vehicle, wherein the control means includes obtaining means operating such that, in a state in which the vehicle is stopped, the one sleeve or all the sleeves of the transmission are in the un-established state, the clutch is in a disengaged state in which no power transmission route is formed between the output shaft of the engine and the input shaft of the transmission, and the engine is operating, the obtaining means adjusts the sleeve position of a specific sleeve, which is the one sleeve or any one of the plurality of sleeves, so as to realize a synchronization state in which the specific sleeve is in the un-established state and the synchronization mechanism corresponding to the specific sleeve performs the synchronization operation; and, in the synchronization state, the obtaining means adjusts the clutch position and obtains, as an engagement start point, a clutch position corresponding to a transition between an engaged state in which a power transmission route is formed between the output shaft of the engine and the input shaft of the transmission, and the disengaged state in which the power transmission route is not formed.

2. A power transmission control apparatus for a vehicle according to claim 1, wherein the obtaining means is configured such that the obtaining means first changes the sleeve position of the specific sleeve from a position corresponding to the un-established state toward a position corresponding to the established state; upon determination that the sleeve position has reached a predetermined position corresponding to the synchronization state, the obtaining means ends the changing of the sleeve position and starts an operation of changing the clutch position from the position corresponding to the disengaged state in a press engagement direction; and the obtaining means then obtains the engagement start point on the basis of a change in the rotational speed of the input shaft of the transmission.

3. A power transmission control apparatus for a vehicle according to claim 1, wherein the obtaining means is configured such that the obtaining means first changes the sleeve position of the specific sleeve from a position corresponding to the un-established state toward a position corresponding to the established state; upon determination that the rotational speed of the input shaft of the transmission has started to decrease, the obtaining means ends the changing of the sleeve position and starts an operation of changing the clutch position from the position corresponding to the disengaged state in a press engagement direction; and the obtaining means then obtains the engagement start point on the basis of a change in the rotational speed of the input shaft of the transmission.

4. A power transmission control apparatus for a vehicle according to claim 1, wherein the obtaining means is configured such that the obtaining means first changes the sleeve position of the specific sleeve from a position corresponding to the un-established state toward a position corresponding to the established state; upon determination that the rotational speed of the input shaft of the transmission has started to decrease, the obtaining means ends the changing of the sleeve position; upon determination that the rotational speed of the input shaft of the transmission has reached to zero, the obtaining means starts an operation of changing the clutch position from the position corresponding to the disengaged state in a press engagement direction; and the obtaining means then obtains the engagement start point on the basis of a change in the rotational speed of the input shaft of the transmission.

5. A power transmission control apparatus for a vehicle according to claim 2, wherein the obtaining means obtains the engagement start point upon determination that the rotational speed of the input shaft of the transmission has exceeded a predetermined very small value while having been increasing.

6. A power transmission control apparatus for a vehicle according to claim 3, wherein the obtaining means obtains the engagement start point upon determination that the rotational speed of the input shaft of the transmission has exceeded a predetermined very small value while having been increasing.

7. A power transmission control apparatus for a vehicle according to claim 4, wherein the obtaining means obtains the engagement start point upon determination that the rotational speed of the input shaft of the transmission has exceeded a predetermined very small value while having been increasing.

* * * * *